United States Patent [19]

Briscoe et al.

[11] Patent Number: 4,995,176
[45] Date of Patent: Feb. 26, 1991

[54] REPLACEABLE WEAR ELEMENT, ASSEMBLY AND METHOD

[75] Inventors: Terry L. Briscoe, Portland; Paul C. Sprunger, Dundee, both of Oreg.

[73] Assignee: Esco Corporation, Portland, Oreg.

[21] Appl. No.: 528,087

[22] Filed: May 24, 1990

[51] Int. Cl.$^5$ .............................................. E02F 9/28
[52] U.S. Cl. .................................. 37/141 R; 37/135; 403/331; 403/353; 403/381; 172/751; 172/753; 172/772
[58] Field of Search ........................ 403/353, 381, 331; 37/135, 141 R, 141 T; 172/719, 749, 751, 753, 772

[56] References Cited

U.S. PATENT DOCUMENTS

| | | | |
|---|---|---|---|
| 3,469,331 | 9/1969 | Wood | 172/719 |
| 4,716,666 | 1/1988 | Potter | 172/719 X |

FOREIGN PATENT DOCUMENTS 2529270 12/1983 France ............................... 403/381

Primary Examiner—Randolph A. Reese
Assistant Examiner—Arlen L. Olsen
Attorney, Agent, or Firm—Tilton, Fallon, Lungmus & Chestnut

[57] ABSTRACT

An assembly of wear element for installation on the wearable part of a structure engageable with abrasive material including a relatively elongated base element adpated to be secured to the wearable part and a relatively elongated wear element releasably, reversibly mounted on the base element, each of the elements having longitudinally spaced apart dovetail surfaces in one outstanding wall portion and a single surface in an opposed outstanding wall portion.

12 Claims, 3 Drawing Sheets

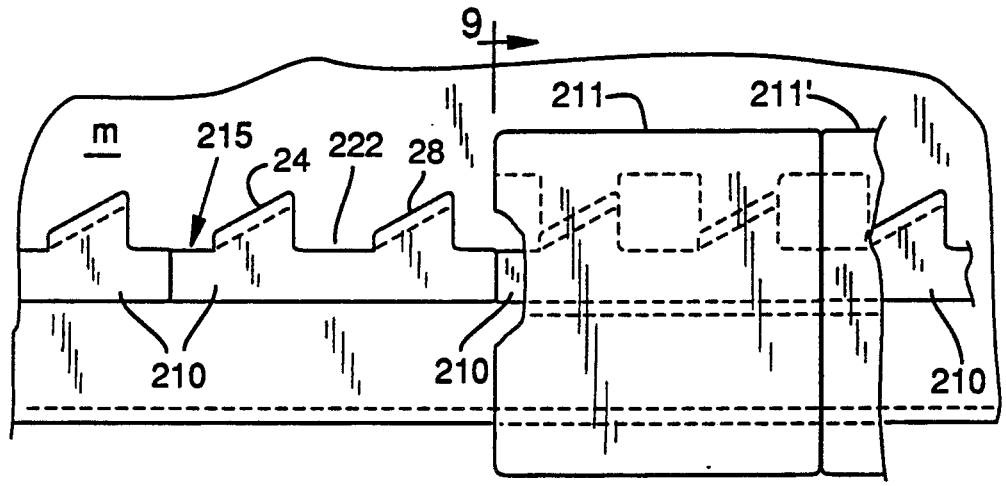
FIG. 10
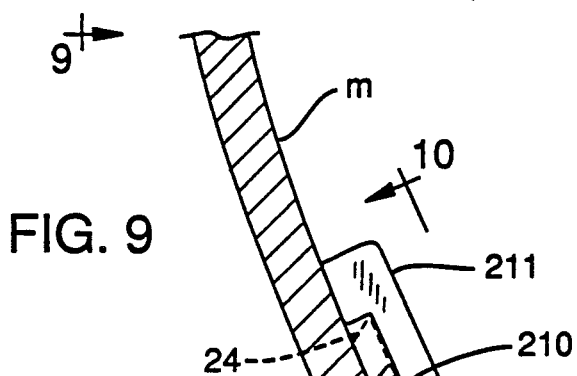
FIG. 9
FIG. 11
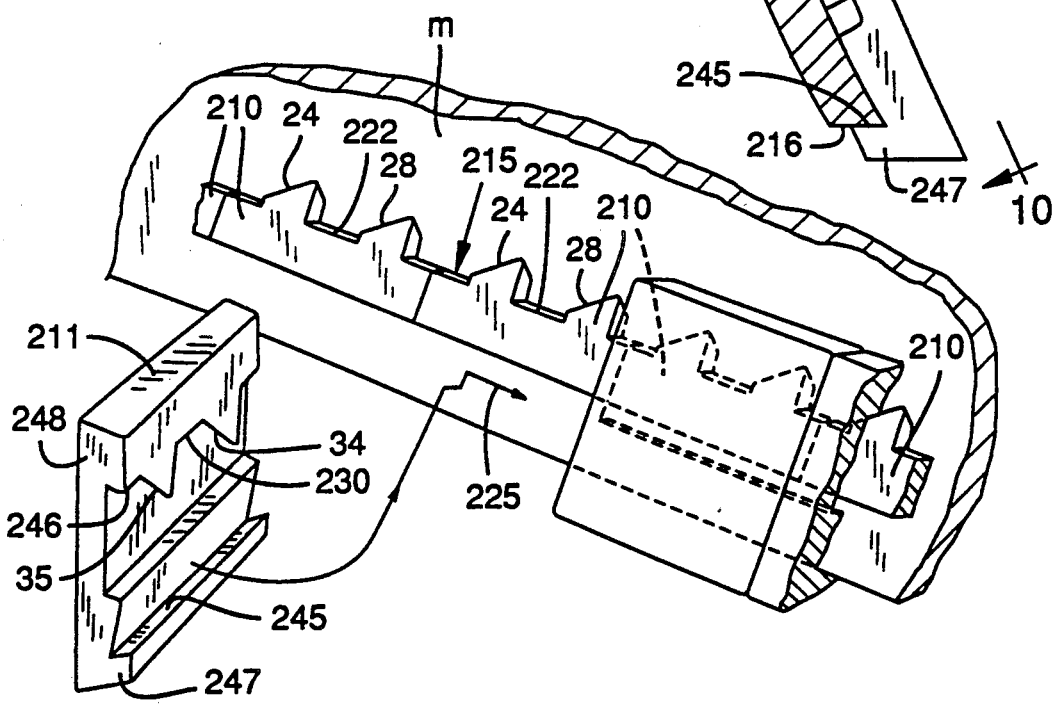

REPLACEABLE WEAR ELEMENT, ASSEMBLY AND METHOD

BACKGROUND AND SUMMARY OF INVENTION

This invention relates to a replaceable wear element, assembly and method, and, more particularly, an assembly for installation on the wearable part of a structure engageable with abrasive material.

This invention is an improvement on co-owned U.S. Pat. No. 4,716,666. In that patent, a pair of spaced apart dovetails were employed to provide a readily replaceable wear element—as for the underside of an excavating bucket. The four dovetail surfaces required some care in manufacture to develop proper contact. According to the instant invention, we have a novel arrangement of dovetail surfaces to provide three-area contact. This results in stability, fit and installation advantages.

It is to be appreciated that the element subject to wear may have to be replaced frequently—many times the base element to which it is attached outlasting a multiple of wearable elements.

Further, the prior art assembly of the base and wearable element was intended for installation in only one direction. This has not served the needs of operators in excavating, mining, etc. where reversibility is either required or is desirable. With the frequent replacement of the wearable element, it is advantageous to extend the life thereof by reversing the same.

Also, according to the instant invention, we achieve reversibility through a novel duplication of dovetail surfaces which makes possible the utilization, for example, of a single element where previously two different replacement elements had to be stored. For example, in the case of a bucket, it is advantageous to provide a wear element that wraps around a corner and thus, utilizing the patent teachings, it would be necessary to have both right and left hand styles. Now, through the practice of the invention, only a single, versatile replacement element is needed. This is a matter of some consequence to operators because buckets are usually employed in primitive conditions and storage facilities limited. Thus, anything that reduces the number of parts to be stored is highly desirable.

According to the preferred embodiment of the invention, each of the base and wear elements has a pair of longitudinally aligned and longitudinally spaced apart dovetail surfaces and a transversely spaced third dovetail surface positioned between the spaced pair of dovetail surfaces. One of the elements has a second pair of longitudinally aligned and longitudinally spaced apart dovetail surfaces flanking the third surface and a single surface interposed between the pair of surfaces. This permits reversible mounting of the two pair-equipped element on the one pair-equipped element, both mountings being "three point" for advantageous ease, stability, etc. Additionally, the three point mounting makes possible advantages in the installation and mounting of wearable parts on earth working equipment such as scraper mold boards. There each of the elements have longitudinally spaced apart dovetail surfaces in one outstanding wall and a single surface in an opposed outstanding wall portion.

The invention is described in conjunction with the accompanying drawing, in which FIG. 1 is a perspective view of the prior art teaching of U.S. Pat. No. 4,716,666;

FIG. 9 is a fragmentary side elevational view of a further modification of the invention useful as a cutting edge for a mold board;

FIG. 10 is a fragmentary front elevational view of the assembly of FIG. 9; and

FIG. 11 is a fragmentary exploded plan view of the elements of FIGS. 9 and 10 showing the mode of assembly.

DETAILED DESCRIPTION

Figure 1:
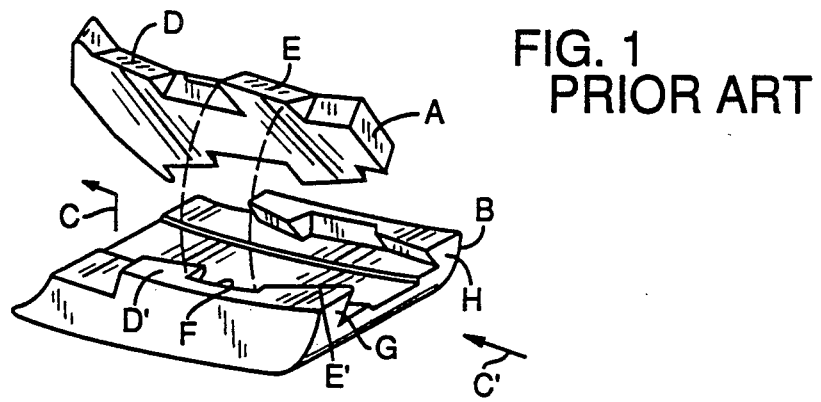

In the illustration given and with reference first to FIG. 1 which is entitled PRIOR ART, the symbol A designates the base element as seen in U.S. Pat. No. 4,716,666 and the symbol B designates the wearable element—in this case a runner for the underside of a dragline bucket. The arrow designated C shows the path through which the element B is moved in being installed on the base element A, i.e., it is first moved upwardly into general co-planar relation and thereafter slid rearwardly so as to engage the two pairs of mating dovetails D and E on element A and D' and E' on element B. The two pairs of dovetail elements are separated by a notch F. The dovetail surfaces D', E' are provided by outstanding walls as at G and H.

Figure 2:
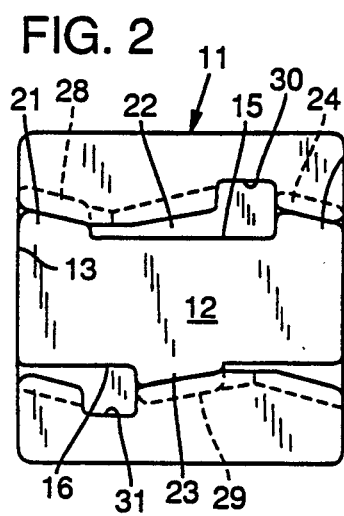
FIG. 2 is a top plan view of the assembled elements of the invention.

Now referring to FIG. 2 which illustrates the assembly of the instant invention, the numeral 10 designates generally a base element while the numeral 11 designates generally the wearable element. In the illustration given, the base element 10 includes a generally plate-like body 12 which is relatively elongated to provide end walls 13, 14 and sidewalls 15, 16. One body surface 17 (see FIG. 3) is the surface which normally would be secured to the wearable part of a structure 18.

Figure 3:
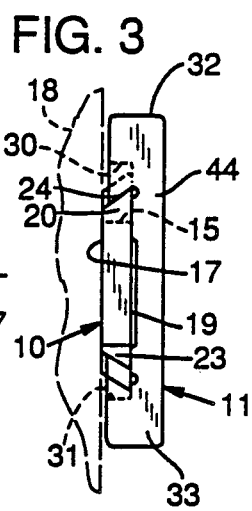
FIG. 3 is an end elevational view of the assembly of FIG. 2.

The surface opposite to the attached surface 17 can be seen only in FIG. 3 and is designated 19 and constitutes the surface in confronting relation to the wearable element 11.

Still referring to the base element 10 of FIG. 2, it will be noted that the body sidewall 15 is equipped with integral transversely extending flanges as at 20 and 21 separated by a relatively longitudinally elongated recess 22. The extremities of the flanges 20, 21 are shaped to provide divergent/convergent dovetail surfaces.

Another flange 23 extends from the opposite body sidewall 16 and its extremity is also shaped to provide a divergent/convergent dovetail surface. Flange 23 is transversely aligned with the recess 22—so that flange 23 is intermediate the length of the body 12 while the flanges 20, 21 are at the ends thereof.

It will be noted that the dovetail surfaces at the extremities of the flanges are doubly sloped—both in the top to bottom direction of the normal dovetail and also sloped fore/aft (see FIG. 3) to provide the divergence/convergence. The dovetail surfaces employed herein are like those in the previously mentioned co-owned U.S. Pat. No. 4,716,666 and express reference is hereby made to that patent for additional details of structure and operation.

Figure 4:
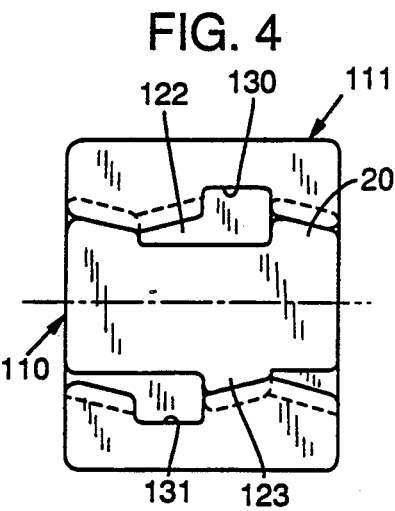
FIG. 4 is a top plan view of a modified form of the invention.
Figure 5:
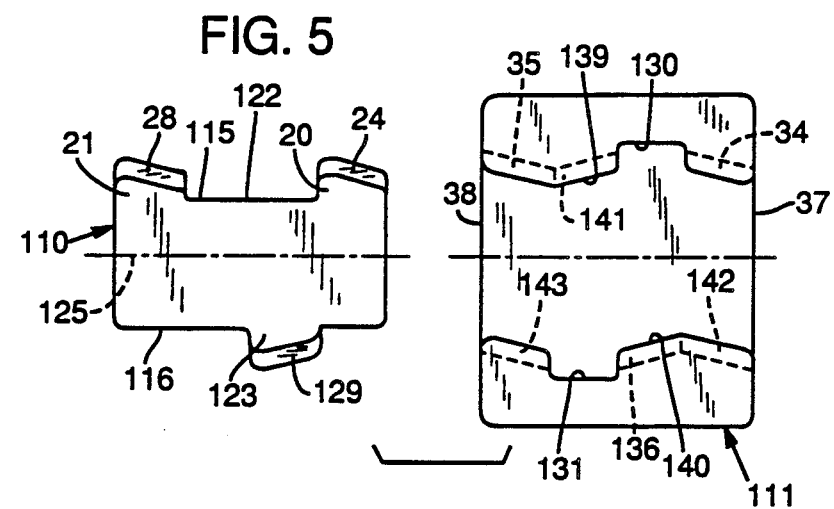
FIG. 5 is an exploded top plan view of the inventive assembly.

Illustrative of the dovetail surfaces is the outer wall or surface 24 of the flange portion 20 in the base element 110 (see the lower central portion of FIG. 5). The showing in FIG. 5 corresponds to the assembly of FIG. 4 which differs from that of FIG. 2 in that the recess 122 is much shorter, and the flange 123 is narrower, i.e., of less extent longitudinally.

The embodiment of FIGS. 4 and 5 permits a different type of mounting of the wear element 111 on the base element 110 from that illustrated in the prior art of FIG. 1. There, the notch F is aligned with the dovetail E, the wearable element B moved engagement with the stationary base A and then moved rearwardly as indicated by the arrow C. The normal material flow is illustrated by the arrow C'.

In contrast, the embodiment of FIGS. 4 and 5 can be employed to mount the wearable element 111 on the base element 110 without utilizing notches as in the prior art, although we provide them as an alternative. The notches are employed for mounting in the embodiment of FIG. 2.

Figure 6:
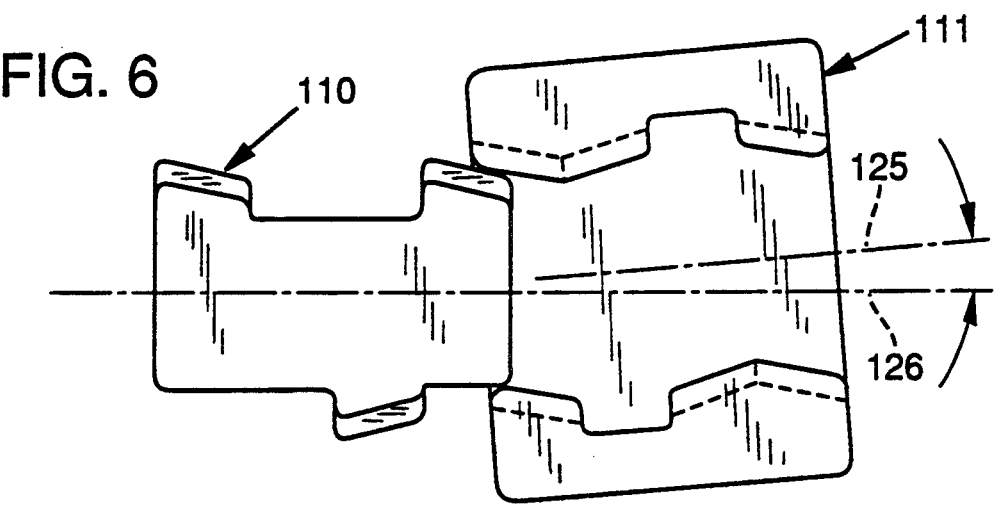
FIGS. 6-8 are exploded top plan views of the FIG. 4 assembly in the process of assembly.
Figure 7:
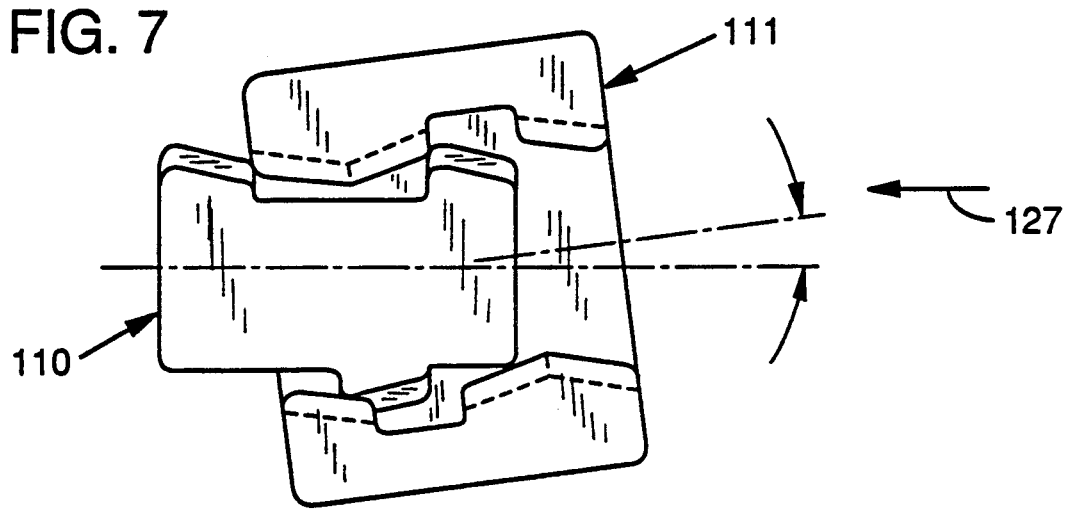
Figure 8:
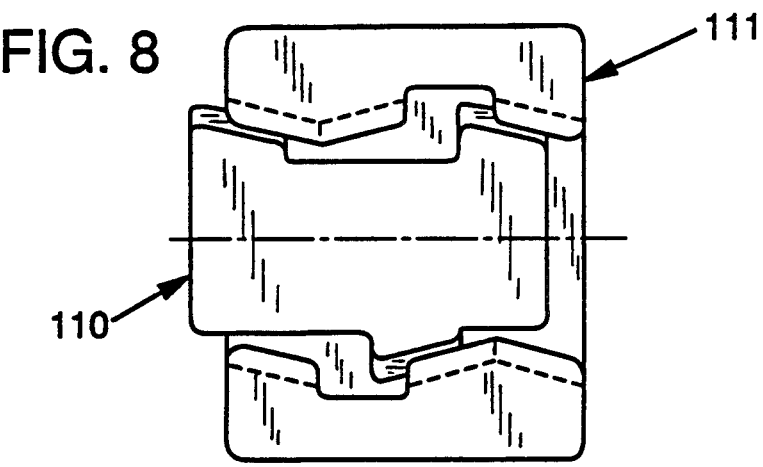

The action of mounting the wearable element 111 on the stationary base element 110 is illustrated in the sequence of views FIGS. 6-8. In FIG. 6, for example, it will be seen that the wearable element 111 is oriented so as to have its longitudinal center line 125 at a minor acute angle to the center line 126 of the base element 110.

Then in FIG. 7, the wearable element 111 is moved rearwardly (the direction of normal material flow being designated by the numeral 127) and then the wearable element 111 is rotated (clockwise as shown) to bring the center lines 125, 126 into alignment so that seating engagement of the various dovetail surfaces can be effected.

The dovetail surfaces on the base element 110 can be seen most clearly at the left hand end of FIG. 5. There, the numeral 28 designates the dovetail surface on the flange 21— the flange 21 being identical in both embodiments, as is the flange 20. Projecting from the opposite sidewall 116 is the flange 123 which, at its extremity, carries the dovetail surface 129. So what is provided is a base element having opposed outstanding sidewalls 15, 16 or 115, 116 which are equipped with dovetail surfaces. The first sidewall, 15, 115 has a pair of longitudinally spaced apart dovetail surfaces, 24, 28 both of which are inclined at a positive angle to the center line 125 (see FIG. 5). The second of the opposing walls, 16, 116 has a single dovetail surface 29, 129 which is inclined at a negative or reverse angle to the center line 125 and is positioned intermediate the adjacent ends of the pair of dovetail surfaces, 24, 28 on the first opposing wall 15, 115.

In FIG. 2, by providing the longer recess 22 (versus the recess 122 of FIG. 4) and the longer flange 23 (versus the flange 123) we are able to make the dovetail surface 29 approximately equal to the sum of the dovetail surfaces 24, 28. In contrast, the dovetail surface 129 in FIG. 5 is approximately the same longitudinal extent as each of the pair of surfaces 24, 28. The equalization of the single dovetail surface with the pair of dovetail surfaces (FIG. 2) makes possible somewhat greater holding power.

Alternative Mounting

For mounting of the wear element 111 on the base element 110 (or the mounting of the wear element 11 on the base 10 of FIG. 2) we provide notches 30 and 31, alternatively 130 and 131 in the wear element 11, 111 respectively. These are provided in the outstanding sidewall portions 32, 33, respectively—see FIG. 3. These correspond in general to the notch F in the outstanding wall portion G of the prior art of FIG. 1. By positioning the wearable element 11 so that the notch 30 is aligned with the flange 20 and the notch 31 is aligned with the rear end of the flange 23, the wearable element 11 can be mounted on the base element 10. Thereafter the wearable element 11 is slid rearwardly (to the left in FIG. 2) so as to bring the various dovetail surfaces into mating engagement. Again, we use the term rearwardly in the context of the direction of normal material flow—designated in FIG. 2 by the arrow 27. This results in increasing seating engagement between the dovetail surfaces on the wear element 11 and the base element 10.

The same mounting movement can be employed relative to the embodiment of FIGS. 4-5. There the notch 130 is aligned initially with the flange 20 and the notch 131 with the flange 123 and, after nesting engagement, the wear element 111 is moved rearwardly to bring the dovetail surfaces into seating engagement. These dovetail surfaces (on the wear element 111) can be best appreciated from a consideration of the right hand portion of FIG. 5. There, the dovetail surface 34 mates with the dovetail surface 24 on the base element 110. Further, the dovetail surface 35 mates with the dovetail surface 2 and the dovetail surface 136 mates with the dovetail surface 129.

Reversibility

For the purpose of enabling the wear element 11, 111 to be mounted with either end 37, 38 positioned forwardly. This can be readily appreciated from a consideration of FIG. 5 where the opposing walls 139, 140 are arranged to have the same contour when one or the other is rotated 180°.

To achieve the dovetail surface engagement upon reverse positioning of the wear element 11, 111, we provide three additional dovetail surfaces. The dovetail surface 141 (see FIG. 5) corresponds to the dovetail surface 136 and the pair of surfaces 142 and 143 correspond to the surfaces 34, 35.

It will be noted that the dovetail surfaces 34, 35 and the reverse-operation corresponding surfaces 143, 142 are adjacent the ends of the generally plate-like body 44 (see FIG. 5) constituting the wearable element 11, 111. Also, irrespective of whether the end 37 or 38 is positioned first, the pair of dovetail surfaces 34, 35 or 143, 142 has a dovetail surface positioned immediately forward of a notch 130, 131, as the case may be. Also, the notch 131 is immediately rearward of the dovetail surface 136 when the wall 37 is positioned forwardly and, when the element 110 is rotated 180°, the single dovetail surface 141 is immediately forward of the notch 130.

Mold Board Attachment

The invention finds advantageous application to wearable elements in earth working such as the mold board m of FIGS. 9-11. There, it is most desirable to provide a sharp bottom cutting and this is achieved by installing on moldboard m a plurality of wearable elements in side-by-side relation as at 211, 211', etc. (see particularly FIG. 10).

For this purpose, the mold board m is equipped with a plurality of base segments 210 in horizontal side-by-side relation. Each base segment 210 has an upper wall generally designated 215 which has the general contour of the previously-described embodiments, viz., convergent dovetail surfaces 24 and 28 separated by a notch 222 (see FIG. 11). However, the other mating surfaces are not provided by the base segments 210 but rather by the mold board as at 216 (see FIG. 9) and the wearable elements 211 as at 245. The mating surfaces or walls 216, 245 do not hve convergent dovetails nor notches but instead have a simple dovetail or bevel. The walls 216, 245 extend parallel to the longitudinal centerline of the wearable elements 211, 211', etc.

By longitudinal centerline, we refer to the direction of movement of the wearable element when it is installed. This is illustrated by the arrow segment designated 225 in FIG. 11. Depending upon the object of the designer, the longer dimension of the wearable element may be either in the direction of movement for installation or transverse thereto.

The wearable elements 211, 211' etc. have upper walls 246 (see FIG. 11) which are also like those of the previously-described embodiments, viz., having convergent dovetail surfaces 34, 35 separated by a notch 230.

In this embodiment (FIGS. 9-11), the wearable element 211 has a pair of outstanding wall portions in the form of the flange 247 at the bottom which develops the straight dovetail surface 245 and the flange 248 at the top which develops the convergent dovetails-notch surface 246.

For installation, the flange 247 at the bottom of the wearable element 211 is hooked unter the bottom wall 216 with the notch 230 aligned with the dovetail surface 24. The wearable element 211 is then pivot4ed to place the dovetail surface 24 in the notch 230 and thereafter the wearable element 211 is slid to the right (as depicted in FIG. 11). When the wearable elements 211 are assembled side-by-side, they serve to lock each other with the most outboard wearable elements being locked in place by bolts or welds. Because of the dovetails being in only one of the upstanding walls, the dovetail angles do not have to be at the same convergence/divergence which relieves the need for exact tolerances.

While in the foregoing specification a detailed description of the embodiment of the invention has been set down for the purpose of illustration, many variations in the details hereingiven may be made by those skilled in the art without departing from the spirit and scope of the invention.

I claim:

1. A replaceable wear element for installation on the wearable part of a structure engageable with abrasive material comprising:

a unitary relatively elongated, generally rectangular plate-like body having end and sidewalls and top and bottom surfaces, one of said surfaces being adapted to engage said abrasive material, the other of said top and bottom surfaces being adapted to be positioned in confronting relation to said wearable part by movement along its longitudinal centerline, said other surface adjacent both sidewalls being equipped with transversely-spaced, integral outstanding portions providing opposing walls, a first of said opposing walls having a pair of longitudinally spaced apart dovetail surfaces adjacent the ends of said body both of which are inclined along the plane of said other surface at a positive angle to said centerline, the second of said opposing walls having a single dovetail surface inclined along said plane at a negative angle to said centerline and positioned intermediate the adjacent ends of said first opposing wall pair of dovetail surfaces.

2. The wear element of claim 1 in which said body has a forward end positioned first in the path of material flow, a notch provided in said first wall adjacent the rear end of the forward one of said pair of dovetail surfaces, and a notch in said second wall adjacent the rear of said single dovetail surface.

3. The wear element of claim 1 in which said first opposing wall is equipped with a single dovetail surface positioned between said pair of longitudinally spaced apart dovetail surfaces and inclined at the same angle as said second wall single dovetail surface, said second opposing wall being equipped with a pair of dovetail surfaces flanking said second wall single dovetail surface and inclined at the same angle as said first wall pair of longitudinally spaced apart dovetail surfaces, said first wall corresponding to said second wall when rotated 180° whereby said wear element is reversely mountable on a mating base element.

4. The wear element of claim 3 in which a notch is provided in each opposing wall adjacent the single dovetail surfaces therein.

5. The wear element of claim 3 in which each of the single dovetail surfaces has a greater longitudinal extent than the length of each of the dovetail surfaces in either said pairs of dovetail surfaces.

6. The wear element of claim 5 in which the length of each single dovetail surface is approximately the same as the combined length of the dovetail surfaces in each pair.

7. The wear element of claim 3 in which the length of each dovetail is approximately the same as the length of each single dovetail surface in each pair.

8. A replaceable wear element for installation on the wearable part of a structure engageable with abrasive material comprising:

a unitary relatively elongated, generally rectangular plate-like body having forward and rear endwalls, sidewalls and top and bottom surfaces, one of said surfaces being adapted to engage said abrasive material, one of said ends being adapted to be positioned first in the path of material flow, the other of said top and bottom surfaces being adapted to be positioned in confronting relation to said wearable part by movement along its longitudinal centerline, said other surface adjacent both sidewalls being equipped with transversely-spaced, integral outstanding portions providing opposing walls, a first of said opposing walls having a pair of longitudinally spaced apart dovetail surfaces adjacent the ends of said body both of which are inclined at the same angle to said centerline, the second of said opposing walls having a single dovetail surface inclined at the reverse angle to said centerline and positioned intermediate the adjacent ends of said first opposing wall pair of dovetail surfaces, a notch in said first wall adjacent the rear end of the forward one of said pair of dovetail surfaces, and a notch in said second wall adjacent the rear of said single dovetail surface, said first opposing wall being equipped with a single dovetail surface positioned between said pair of longitudinally spaced apart dovetail surfaces and inclined at the same angle as said second wall single dovetail surface, said second opposing wall being equipped with a pair of dovetail surfaces flanking said second wall single dovetail surface and inclined at the same angle as said first wall pair of longitudinally spaced apart dovetail surfaces, said first wall corresponding to said second wall when rotated 180° whereby said wear element is reversely mountable on a mating base element, the length of each dovetail being approximately the same as the length of each single dovetail surface in each pair.

9. A replaceable wear element for installation on the wearable part of a structure engageable with abrasive material comprising:

a unitary relatively elongated, generally rectangular plate-like body having forward and rearward end walls sidewalls and top and bottom surfaces, one of said surfaces being adapted to engage said abrasive material, one of said ends being adapted to be positioned first in the path of material flow, the other of said top and bottom surfaces being adapted to be positioned in confronting relation to said wearable part by movement along its longitudinal centerline, said other surface adjacent both sidewalls being equipped with transversely-spaced, integral outstanding portions providing opposing walls, a first of said opposing walls having a pair of longitudinally spaced apart dovetail surfaces adjacent the ends of said body both of which are inclined at the same angle to said centerline, the second of said opposing walls having a single dovetail surface inclined at the reverse angle to said centerline and positioned intermediate the adjacent ends of said first opposing wall pair of dovetail surfaces, a notch in said first wall adjacent the rear end of the forward one of said pair of dovetail surfaces, and a notch in said second wall adjacent the rear of said single dovetail surface, said first opposing wall being equipped with a single dovetail surface positioned between said pair of longitudinally spaced apart dovetail surfaces and inclined at the same angle as said second wall single dovetail surface, said second opposing wall being equipped with a pair of dovetail surfaces flanking said second wall single dovetail surface and inclined at the same angle a said first wall pair of longitudinally spaced apart dovetail surfaces, said first wall corresponding to said second wall when rotated 180° whereby said wear element is reversely mountable on a mating base element, each of the single dovetail surfaces having a greater longitudinal extent than the length of each of the dovetail surfaces in either said pairs of dovetail surfaces.

10. An assembly of wear elements for installation on the wearable part of a structure engageable with abrasive material comprising a relatively elongated base element adapted to be secured to said wearable part and a relatively elongated wear element releasably mounted on said base element along the longitudinal centerlines thereof said elements having confronting faces, each of said elements having opposed outstanding sidewalls equipped with mating dovetail surfaces within a plane containing the face thereof, a first sidewall of each element having a pair of longitudinally spaced apart dovetail surfaces both of which are inclined at the same angle to said centerline within said plane, the second of said opposing walls having a single dovetail surface inclined in said plane at the reverse angle to said centerline and positioned intermediate the adjacent ends of said first opposing wall pair of dovetail surfaces.

11. The assembly of claim 10 in which said first wall is equipped with a third dovetail surface parallel to said single dovetail surface in said second wall, said second wall being equipped with a pair of dovetail surfaces in transverse alignment and parallel to said pair of dovetail surfaces in said first wall whereby said element is removably mountable on said base element.

12. A method of assembling a wearable element on the wearable part of a structure engageable with abrasive material comprising providing a unitary relatively elongated generally rectangular plate-like body having forward and rear endwalls, sidewalls and top and bottom surfaces, one of said surfaces being secured to said wearable part to constitute a base element for removably mounting said wearable element, a first one of said base element sidewalls having two longitudinally spaced apart dovetail surfaces adjacent the ends thereof both of which are inclined at the same angle to said center line, the second of said opposing walls having a single dovetail surface inclined at the reverse angle to said centerline and positioned intermediate the adjacent ends of said first opposing wall dovetail surfaces, providing said wearable element having outstanding portions providing opposed sidewalls configured to mate with said base element first and second sidewalls, orienting said wearable element to position its centerline at a minor acute angle to the centerline of said base element and moving one end of said movable element into engagement with said base element, after the forward dovetail surface of said wear element has passed the rear dovetail surface of said base element, rotating said wear element to position its centerline in alignment with the base element center line, and and moving said wear element forward until all dovetail surfaces of the wear element engage all dovetail surfaces on said base element.

* * * * *